July 19, 1938.    J. SLANE    2,124,434
HEATER
Filed April 16, 1937    2 Sheets-Sheet 1

JOHN SLANE
INVENTOR.

BY

ATTORNEY.

July 19, 1938.  J. SLANE  2,124,434
HEATER
Filed April 16, 1937   2 Sheets-Sheet 2

JOHN SLANE
INVENTOR.

BY

Jack A. Schley
ATTORNEY.

Patented July 19, 1938

2,124,434

UNITED STATES PATENT OFFICE 2,124,434

HEATER

John Slane, San Antonio, Tex.

Application April 16, 1937, Serial No. 137,203

6 Claims. (Cl. 122—208)

This invention relates to new and useful improvements in heaters.

One object of the invention is to provide an improved heater so arranged that more efficiency may be obtained in heating a liquid and so constructed that a constant supply of heated liquid is available.

An important object of this invention is to provide a heater having a heating chamber through which liquid is circulated, there being a series of improved baffles within the chamber whereby incoming cool liquid is caused to travel through an elongate or circuitous path and also whereby the flow of said liquid through the chamber is retarded, thereby resulting in positive heating of the liquid as the same flows through the chamber.

A further object of the invention is to provide an improved heating chamber having reservoirs or pockets therein through which the water to be heated is circulated, said pockets trapping the liquid therein when the liquid is not flowing, whereby the incoming cold liquid will admix with the hot liquid standing in said pockets to make faster heating of the incoming liquid, and also whereby a constant supply of heated liquid is present in the chamber at all times.

A further object of the invention is to provide an improved heater so constructed that the other surface of said heater, to which heat is applied, has an increased heat absorption surface which makes for maximum heating with minimum heat application.

Another object of the invention is to provide an improved heater which may be readily connected in a water, or other liquid line, the heater itself being capable of easy assembly or disassembly, and having a minimum number of parts.

A still further object of the invention is to provide an improved heater having its heating chamber divided into two sections both of which communicate with the liquid inlet whereby the liquid to be heated may pass to either one or the other of said sections; each section being so constructed that the liquid entering the same is circulated therethrough and conducted to the outlet whereby the liquid is heated in flowing through one of the sections and the necessity of flowing the liquid through the entire area of the heating chamber is eliminated, which reduces the time necessary to heat the liquid.

A construction designed to carry out the invention will be hereinafter described, together with other features of the invention.

The invention will be more readily understood from a reading of the following specification and by reference to the accompanying drawings, in which an example of the invention is shown, and wherein.

Figure 1:
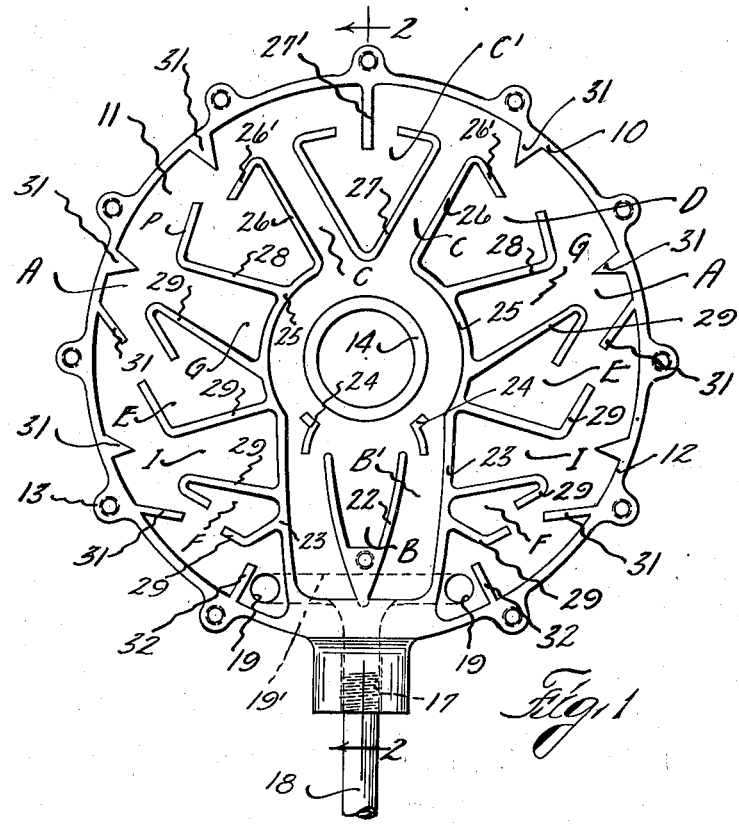
Figure 1 is a plan view of the interior of the device.
Figure 3:
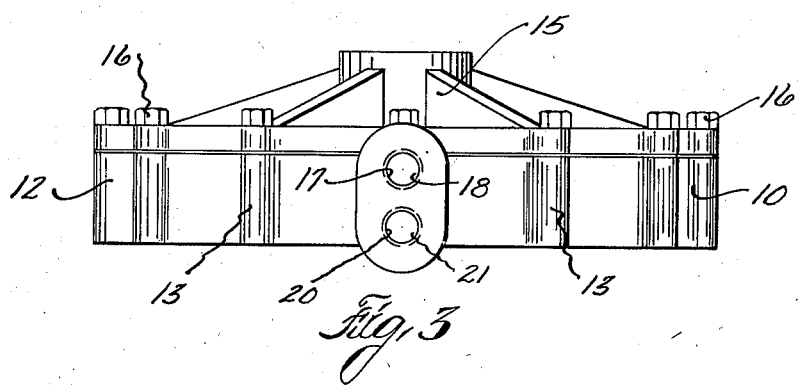
Figure 3 is a side elevation of the device.
Figure 2:
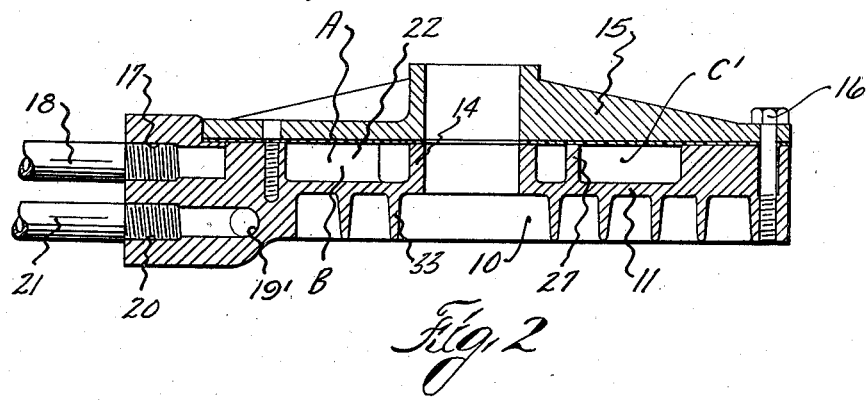
Figure 2 is a transverse, sectional view taken on the line 2—2 of Figure 1.

In the drawings, the numeral 10 designates a circular casing having a bottom 11 and an outwardly extending peripheral flange 12, said flange being provided with internally screw-threaded ears 13. An axial collar 14 is preferably made integral with the bottom 11 of the casing and extends upwardly to the same plane as the top of the flange 12. A cover member 15 is placed on top of the flange 12 and engages the collar 14 and is secured to the flange by bolts 16 which pass through the cover and are screwed into the holes provided in the ears 13. Thus it will be seen that between the cover 15 and the bottom 11 and surrounding the collar 14, there is formed a circular liquid chamber A. For introducing liquid into the chamber A, an internal screw-threaded inlet 17 is preferably made integral with the flange 12 and has an inlet pipe 18 connected therein. Outlet ports 19 are provided in the bottom 11 of the casing being located one on each side of the inlet 17. These ports 19 are connected by a passage 19' from which extends a central outlet 20 and a suitable outlet pipe 21 is attached to the outlet 20. From the above it will be seen that liquid introduced through the pipe 18 will flow through the chamber and pass therefrom through the pipe 19.

For elongating the travel path of the liquid through the chamber a suitable baffling is disposed within the chamber. This baffling includes a V-shaped baffle or deflecting plate 22 located at the mouth of the inlet in the chamber A and the point of this baffle is in alinement with the axis of the collar 14. The walls of the baffle form a pocket B open at its inner end. Extending inwardly toward the center of the chamber from the sides of the mouth of the inlet are diverging walls 23, spaced from the baffle walls and these walls 23 and the baffle walls form a passageway B' on either side of the baffle 22. Adjacent the open end of the V-shaped baffle 22 and spaced from the walls 23 are deflecting plates 24 which deflect liquid into the pocket B. Extending from the outer ends of the walls 23 and preferably integral therewith are arcuate members 25 which have the same center as the collar 14. The members 25 have a greater arc so as to be spaced from the collar, whereby passageways around said collar are formed. Diverging radial baffles or walls 26 extend from the arcuate members 25 and have their outer ends terminated short of the flange 12. The extreme outer end of each wall 26 is bent upon itself at substantially a right angle so as to form an overhanging lip 26'. Located between the diverging walls 26 is a V-shaped baffle 27 having its point in alinement with the axis of the collar 14, and passageways C are formed between the walls 26 and the walls of the V-shaped baffle. The outer ends of the baffle are terminated short of the flange and bent inwardly toward each other and obviously a pocket C' is provided within the baffle. A deflector 27' extends inwardly into the baffle centrally thereof and acts to deflect liquid into the pocket C'. Thus it will be seen that liquid introduced into the chamber A will strike the member 22 and flow along the passageways B' and the deflecting plates 24 will cause part of the liquid to flow into the pocket B and admix with liquid standing therein. Some liquid will flow around the collar 14 and again be separated into two streams by the V-shaped baffle 27 and flow through the divergent passageways C toward the peripheral flange 12. A portion of the liquid flowing from the passageways will enter the pocket C'.

It will be seen that the flow of liquid is divided into two distinct streams by the V-shaped baffle 27, one stream flowing through the chamber A in a counter-clockwise direction and the other stream flowing in a clockwise direction. Both streams of liquid will be taken through a like course and, therefore, a description of the path of only one stream is considered necessary. After the liquid has passed through the passageway C it will strike the peripheral flange 12 whereby a portion of said liquid is directed back toward the V-shaped baffle 27 and into the pocket C' therein. The remainder or major portion will flow in a clockwise direction along the periphery of the chamber. This stream of liquid will flow into a pocket D which is formed by the member 26 and by a baffle 28 which extends outwardly from the arcuate member 25. The extreme outer end of the baffle 28 is bent inwardly to overhang the pocket D and is located closer to the flange 12, or to the periphery of the chamber than is the overhanging lip 26' of the member 26, whereby said baffle extends beyond the member 26. With such arrangement, the flowing liquid strikes the outer end of the baffle beneath the inturned extension thereof, and is directed inwardly into the pocket D. To further direct the liquid into the pocket D, an inwardly extending deflector 31 is preferably integral with the flange 12 and is located substantially of the center of the pocket. Therefore, the liquid flowing from the passage C is directed into the pocket D and is circulated therethrough.

Manifestly, the liquid is whirled or agitated by its flow through the pocket D and then escapes from said pocket to continue its clockwise travel around the chamber.

After escaping from the pocket D the liquid passes through pockets G, E, F and I, which are disposed in the chamber between the pocket D and outlet port 19. The pockets E and F are formed by baffles 29, and are similar to the pocket D formed by the member 26 and baffle 28. Pocket G is formed by the baffle 28 of pocket D and baffle 29 of pocket E, likewise pocket I is formed by the baffles that formed the pockets E and F, as is clearly shown in Figure 1. A deflecting member 31 is located at the mouth of each pocket so as to direct liquid thereinto. Thus it will be seen that the liquid is deflected into each pocket and therefore the flow of the liquid is retarded. After the liquid escapes from pocket F it will strike a baffle 32 and flow around it and into the outlet port 19 whereby the liquid is conducted out through the outlet 20 and outlet pipe 21.

For greater heat absorption there is provided concentric rings 33 integral with the bottom 11 of the casing. The rings provide an increased area which makes for maximum heating with minimum heat application.

Figure 4:
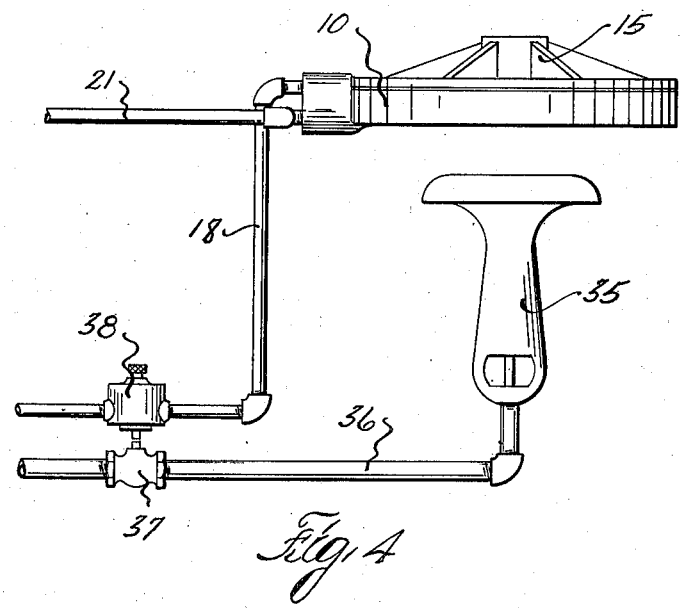
Figure 4 is an elevation showing the device connected in a line.

For heating the device, I have shown in Figure 4 a burner 35 which is connected in a feed line 36, said feed line is provided with a valve 37, said valve is connected into the control means 38 in the fluid inlet pipe 18. This type of burner has proved sufficient but obviously any type of burner desired may be used.

In operation, the liquid is supplied to the chamber A by the inlet 17, said liquid will strike the baffle 22 and pass around, some liquid going into the pocket B caused by the deflecting plates 24 and then pass around the collar 14 and out through the passageways C. Manifestly, the liquid can flow in a clockwise or a counter-clockwise direction. After passing through the passage or channel C said liquid will be deflected into each of the pockets, and the flow of said liquid will be retarded by this system of baffling which holds the liquid within the chamber a sufficient length of time to efficiently heat the same. The heated liquid escapes from the chamber through the port 19 and the outlet 20.

It will be seen that the walls of the baffles will be heated and will tend to heat the incoming cool liquid. The pockets formed in the heater will hold some of the liquid when the device is not operative, whereby this trapped liquid is heated to a much higher temperature than is usually necessary. Therefore, when circulation of the liquid is again started, the cool incoming liquid will contact the hot baffles and will admix with the trapped overheated liquid within the pockets, which will result in a quicker or more rapid heating of the cool liquid.

It is pointed out that by this system of baffling the introduced liquid is divided into two streams and each stream is caused to flow over only one half of the heater, thereby the time necessary for liquid to pass through the heating chamber to be sufficiently heated is greatly reduced.

What I claim and desire to secure by Letters Patent, is:

1. A heater including, a cylindrical housing having a heating chamber therein, means for circulating a liquid to be heated through said chamber, a plurality of individual pockets disposed radially within the chamber, said pockets having their inner ends closed and their outer ends open, said outer ends being spaced from the periphery of the chamber so as to provide an annular passageway between the pockets and the periphery of the housing, whereby liquid flowing along said passageway may enter and circulate through said pockets.

2. A heater including, a cylindrical housing having a heating chamber therein, means for circulating a liquid to be heated through said chamber, means for dividing the incoming liquid into two paths whereby said liquid flows in a clockwise and a counter-clockwise direction, a plurality of individual pockets disposed radially within the chamber, said pockets having their inner ends closed and their outer ends open, said outer ends being spaced from the periphery of the chamber so as to provide an annular passageway between the pockets and the periphery of the housing, whereby liquid flowing along said passageway may enter and circulate through said pockets.

3. A heater including, a cylindrical housing having a heating chamber therein, means for circulating a liquid to be heated through said chamber, means for dividing the incoming liquid into two paths whereby said liquid flows in a clockwise and a counter-clockwise direction, a plurality of individual pockets disposed radially within the chamber, said pockets having their inner ends closed and their outer ends open, said outer ends being spaced from the periphery of the chamber so as to provide an annular passageway between the pockets and the periphery of the housing, whereby liquid flowing along said passageway may enter and circulate through said pockets, and deflecting means located around the periphery of the chamber to deflect the liquid in said passageway into each of said pockets.

4. A heater including, a cylindrical housing having a heating chamber provided with a liquid inlet, baffle means at the mouth of the inlet for dividing the incoming liquid into two streams, said chamber being provided with baffles forming two passages which extend substantially diametrically across the chamber for conducting the streams of liquid across the chamber, a series of baffles located adjacent the periphery of the chamber and forming fluid passages which lead from the first named passages to conduct one of the streams in a clock-wise direction and the other stream in a counter-clockwise direction around the chamber, and a common outlet leading from the peripheral passages for conducting the liquid from the chamber.

5. A heater including, a cylindrical housing having a heating chamber provided with a liquid inlet, baffle means at the mouth of the inlet for dividing the incoming liquid into two streams, said chamber being provided with baffles forming two passages which extend substantially diametrically across the chamber for conducting the streams of liquid across the chamber, a series of baffles located adjacent the periphery of the chamber and forming fluid passages which lead from the first named passage to conduct one of the streams in a clockwise direction and the other stream in a counter-clockwise direction around the chamber, means communicating with the peripheral passages for receiving the liquid flowing through said passages to retard and delay the flow of said liquid whereby the same is heated in its flow from the inlet to the outlet of the chamber, and a common outlet leading from the peripheral passages for conducting the liquid from the chamber.

6. A heater including, a cylindrical housing having a heating chamber provided with a liquid inlet, baffle means at the mouth of the inlet for dividing the incoming liquid into two streams, said chamber being provided with baffles forming two passages which extend substantially diametrically across the chamber for conducting the streams of liquid across the chamber, a series of baffles located adjacent the periphery of the chamber and forming fluid passages which lead from the first named passages to conduct one of the streams in a clockwise direction and the other stream in a counter-clockwise direction around the chamber, a plurality of pockets communicating with each peripheral passage and disposed between each diametrically extending passage and the outlet for permitting liquid flowing toward the outlet to circulate therethrough to assure efficient heating of said liquid, and a common outlet leading from the peripheral passages for conducting the liquid from the chamber.

JOHN SLANE.